US007837210B2

(12) United States Patent
Kylstra et al.

(10) Patent No.: US 7,837,210 B2
(45) Date of Patent: Nov. 23, 2010

(54) WHEELCHAIR DRIVE SYSTEM WITH LEVER PROPULSION AND A HUB-CONTAINED TRANSMISSION

(75) Inventors: Bart Kylstra, San Francisco, CA (US); Nathan Isaiah Jauvtis, San Francisco, CA (US); Thomas Martin Cook, San Francisco, CA (US); Jeremy Winston Huff, San Francisco, CA (US); Sean Kerrel, Oakland, CA (US)

(73) Assignee: Daedalus Wings, Inc., San Francisco, CA (US)

( * ) Notice: Subject to any disclaimer, the term of this patent is extended or adjusted under 35 U.S.C. 154(b) by 74 days.

(21) Appl. No.: 12/079,754

(22) Filed: Mar. 28, 2008

(65) Prior Publication Data

US 2008/0238022 A1 Oct. 2, 2008

Related U.S. Application Data

(60) Provisional application No. 60/921,323, filed on Mar. 31, 2007.

(51) Int. Cl.
*B62M 1/16* (2006.01)

(52) U.S. Cl. .................................... 280/250.1; 280/244

(58) Field of Classification Search ............. 280/250.1, 280/244, 253; 188/2 F, 26
See application file for complete search history.

(56) References Cited

U.S. PATENT DOCUMENTS

| | | | | |
|---|---|---|---|---|
| 4,560,181 A | | 12/1985 | Herron | 280/242 WC |
| 5,167,168 A | | 12/1992 | Beumer | 74/810.1 |
| 5,188,383 A | | 2/1993 | Thompson | |
| 5,362,081 A | | 11/1994 | Beidler et al. | |
| 5,632,499 A | | 5/1997 | Hutcherson et al. | |
| 6,017,046 A | | 1/2000 | Markovic | 280/250.1 |
| 6,053,830 A | * | 4/2000 | Glaeser | 474/101 |
| 6,715,780 B2 | * | 4/2004 | Schaeffer et al. | 280/248 |
| 6,820,885 B1 | | 11/2004 | Oshimo | 280/243 |
| 6,893,035 B2 | | 5/2005 | Watwood et al. | 280/242.1 |
| 7,344,146 B2 | * | 3/2008 | Taylor | 280/246 |
| 2002/0153691 A1 | * | 10/2002 | Liao et al. | 280/250.1 |

* cited by examiner

*Primary Examiner*—Tony H. Winner
(74) *Attorney, Agent, or Firm*—Schneck & Schneck

(57) ABSTRACT

A drive mechanism for a lever propulsion wheelchair includes at least one clutch and at least one gear set contained within a central hub housing operatively coupled to the drive surface of the main wheel being driven. In the preferred embodiment, there are additional clutches and gear sets contained within the hub housing and coaxial to the wheel. By locating the transmission components within the hub housing and providing the coaxial arrangement, various user capabilities may be enabled without a significant increase in wheelchair width, as compared to the width of conventional push-rim propulsion wheelchairs. Transmission components are cooperatively arranged to provide capabilities that may include forward, rearward and neutral "gears," braking, anti-rollback, and quick-release removal.

14 Claims, 8 Drawing Sheets

WHEELCHAIR DRIVE SYSTEM WITH LEVER PROPULSION AND A HUB-CONTAINED TRANSMISSION

CROSS REFERENCE TO RELATED APPLICATION

This application claims priority from provisional application No. 60/921,323, filed Mar. 31, 2007.

TECHNICAL FIELD

The invention relates generally to drive mechanisms for use with a wheelchair and more particularly to wheelchair drive systems that use lever propulsion.

BACKGROUND ART

The number of people who depend upon a wheelchair for mobility increases as medical science continues progress in the treatment of the elderly and the disabled. Manually driven wheelchair design has evolved to the point that currently available products are lightweight, simple and reliable. The high percentage of manually driven wheelchairs use pushrim propulsion in which the user applies force to a pushrim that is provided for each main wheel.

A concern with the use of pushrim propulsion is that the poor biomechanics too often results in ineffective propulsion, pain and injury. Users of pushrim manual wheelchairs may suffer from Repetitive Strain Injuries (RSI) of the wrists and shoulders. Too often, this suffering by wheelchair users leads to downward spirals of physical activity, health and social interaction.

The shortcomings of pushrim wheelchairs cause many users to turn to electric wheelchairs. However, such wheelchairs are expensive and difficult to transport. More importantly, electric wheelchairs result in an almost total loss of therapeutic physical exertion. No matter how sophisticated the design, the health problems associated with a sedentary lifestyle result. The overall physical health, social integration and emotional well-being of users suffer.

It has been shown that lever propulsion avoids the ergonomic and efficiency shortcomings of the pushrim design, as well as the economic and sedentary concerns of the electric wheelchair design. For a pushrim wheelchair, there is only a push motion, since no energy is derived from the return stroke of a user's arm. In addition, there is only a short "window" during which the propulsion stroke is optimized, due to the significant change in geometry of the arm and its relationship with the pushrim during the push stroke. Time is also lost as a consequence of the requirement to engage and disengage the pushrim. It has been determined that the cumulative effect is that only 20 percent of the total cycle time is utilized for pushrim propulsion.

In order to maintain an acceptable speed, the required forces applied to a pushrim during the short propulsion window are high, leading to overload and subsequent injury. These forces may be magnified several fold while propelling up an incline. There is also typically a momentary negative application of force at the beginning and end of a stroke, while engaging and disengaging the hand relative to the pushrim. The end result is a significant biomechanical efficiency of less than 10 percent.

In comparison, the nature of lever propulsion encourages a steady application of force. Approximately 50 percent of the total cycle time is utilized for propulsion of many wheelchairs that utilize levers. There is less change in the geometry of the arm relative to the lever during a stroke. Additionally, the hand and lever remain in engagement. These factors alone result in an estimated 80 percent reduction in the peak required force during the propulsion cycle.

Knowledge of the structure of a human shoulder plays an important role in comparing pushrim propulsion to wheelchair lever propulsion. A shoulder is extremely flexible, as compared to a hip joint. This requires the muscles, tendons and ligaments of the shoulder to stabilize the joint when force or torque is applied through the joint. Ideally, the force applied to a hand should pass along a line radial to the shoulder joint, so that minimal torque is generated at the joint. However, for optimal mechanical efficiency, the force applied to the pushrim should be tangential to the rim, causing a considerable torque at the shoulder joint. Users of pushrim wheelchairs tend to compromise and apply a force that is closer to the center of the drive wheel. This is also required to generate a sufficient friction force between the hand and the rim. The compromise, along with the high peak loading, results in muscle, tendon and ligament strain, as well as a high loading of the joint cartilage. In comparison, lever use results in a force that is essentially in line with the shoulder joint, so that minimal torque is generated and the force applied is in the same direction as the lever motion. Motion is nearly in a horizontal direction, which more fully utilizes larger muscles, such as the latissimis dorsi, pectoralis and trapezius muscles.

Wrist mechanics must also be considered. For pushrim propulsion, the forces at the hand are not in line with the wrist, and therefore require counteracting torque. In addition, there is a counterproductive torque produced as a consequence of grasping the pushrim at the palm and index finger. The hand is required to follow the circular motion of the rim, which requires the wrist joint to flex considerably. These various elements may induce Carpel Tunnel Syndrome. For lever propulsion designs, there is no repeated flexing and unflexing of the fingers. Additionally, the required grip force is significantly reduced, since the force applied to the lever is perpendicular to the contact area. Lever propulsion significantly reduces and sometimes eliminates the factors that lead to Carpel Tunnel Syndrome.

Wheelchairs that utilize lever propulsion are known. U.S. Pat. No. 4,560,181 to Herron describes a wheelchair and drive mechanism powered by reciprocating operation of a lever. The drive mechanism provides a variable gear ratio for operation at various speeds and on different inclines. Additionally, connecting arms are coupled to the lever to alternately engage and disengage a ratchet wheel, so that energy is transferred during both a forward and a rearward stroke of the lever. Wheelchairs that utilize lever propulsion and enable both forward and rearward drive are also available. U.S. Pat. No. 6,893,035 to Watwood et al. describes a transmission between a lever arm and a wheel, with the transmission being biased into either a forward direction or a reverse direction. U.S. Pat. No. 6,017,046 to Markovic sets forth a wheelchair drive system with a number of capabilities, including selection of wheelchair drive direction, continuous transfer of power in either direction of lever movement, and hand-controlled braking. Two other lever propulsion wheelchairs of interest are disclosed in U.S. Pat. No. 6,820,885 to Oshimo and U.S. Pat. No. 5,167,168 to Beumer.

While prior art lever propulsion wheelchairs operate well for their intended purposes, further improvements are sought. One area of concern is geometry related. The addition of the lever and its transmission may add significantly to the width of the wheelchair. Changes in legal requirements and in societal perceptions have brought improvements with regard to allowing access to public areas by persons in wheelchairs, but the added width of lever propulsion may prevent maneuverability through tight spaces. The width of a wheelchair may also be an issue for storage, such as when the wheelchair is placed in a car or other vehicle. A related concern is the placement of the levers. Levers which are outboard of the wheels expose the user's hands and knuckles to collisions. An object of the invention is to provide a wheelchair drive mechanism that utilizes lever propulsion without a large increase in wheelchair width or weight. Preferably, this is achieved while enabling multiple lever-controlled capabilities.

SUMMARY OF THE INVENTION

In accordance with the invention, a transmission configured to translate motion of a lever to drive of a wheelchair includes at least one clutch and gear set contained within a hub housing of the main wheel being driven. The gear set is coaxial with the wheel. In the preferred embodiment, there are additional clutches and gear sets contained within the hub housing, with these transmission components being cooperative to provide a user with various capabilities. Because these transmission components are contained within the hub housing of the driving wheel, the various user capabilities are available without a significant increase in wheelchair width, as compared to arrangements in which transmissions are located inboard or outboard of the wheel. Moreover, by locating the transmission components within the hub housing, the drive mechanism can be easily retrofit to a conventional wheelchair and can be readily added to and removed from the wheelchair as desired.

The drive mechanism for a wheelchair includes a lever with a handgrip end and a pivot end. The lever is connected at its pivot end to accommodate reciprocating motion (i.e., a forward stroke and a rearward stroke). The drive mechanism also includes a driving wheel operatively coupled to a central hub in which transmission components are internally located. In the preferred embodiment, the internally located transmission components include first and second unidirectional clutches, a user-controlled clutch and a gear train. The first unidirectional clutch is connected to translate the reciprocating motion of the lever to a forward drive of the wheel. In at least some embodiments, both the forward stroke and the rearward stroke of the lever are translated to driving power. The second unidirectional clutch is connected to translate lever motion to a rearward drive of the wheel. The user-controlled clutch is enabled to selectively vary an operative coupling of the wheel among a first condition of engagement with the first unidirectional clutch, a second condition of engagement with the second unidirectional clutch, and a third condition of disengagement from both the first and second unidirectional clutches. In this third condition, the transmission is in "neutral gear."

The gear train includes a number of interwoven gear sets, which are preferably planetary gear sets. Each planetary gear set has at least one rotationally constrained member that is connected to a subframe configured to transfer reaction forces from the transmission to the main frame of the wheelchair. Planetary gear sets also include rotational members that are coupled to each other and to a reciprocating rotational input. The rotational members extend through the rotationally constrained members such that output of the gear train rotate in opposite directions from one another independent of direction of the reciprocating rotational input. These outputs of the gear train are coupled to drive the unidirectional clutches. Each unidirectional clutch has a clutch output with axial protrusions configured to mesh with the user-controlled clutch.

The user-controlled clutch may include a sliding member which is permitted to slide axially, but is rotationally fixed relative to the wheel hub. The position of the sliding member determines the operative linkage of the clutch outputs to the driving wheel.

The handgrip end of the lever preferably includes a control that permits the user to determine the position of the sliding member, and therefore the direction of wheelchair drive. One embodiment of the means for this actuation of the user-controlled clutch includes a first set of rotationally fixed but axially sliding pins which extend through the gear train and contact a thrust ring. The thrust ring is connected to transfer axial shifting motion to a second set of sliding pins rotating with the inputs of the two unidirectional clutches. The first set of rotating pins is axially actuated by rotation of a shift cam having helical ramps. Rotation of this shift cam is controlled by a cable connected to a shifter which is mounted at the handgrip end of the lever.

In at least some embodiments, the first unidirectional clutch (the "forward clutch") has reciprocating and oppositely rotating inputs which are oriented to drive a clutch output in one desired direction. A first of these inputs is coupled to drive the unidirectional clutch in a desired direction during a first input stroke (e.g., the forward stroke), during which time a second input is configured to slip. In contrast, the first input slips and the second input provides drive to the first unidirectional clutch during the opposite input stroke (e.g., the rearward stroke). As an added feature, the first unidirectional clutch may be configured to prevent back-driving of the transmission.

An advantage of the invention is that the hub-contained transmission rectifies the reciprocating lever motion into rotation of the driving wheel without a significant impact on wheelchair width. In the preferred embodiment, the direction of driving wheel rotation can be shifted quickly and remotely by the user. A neutral gear is provided, whereby the user can propel the wheelchair by conventional means, such as push-rim propulsion. The system may include a brake that transmits braking force directly to the frame of the wheelchair, prohibiting the lever from being pulled out of the user's hand while braking. The transmission allows free rotation of the wheel in the desired direction and may include an anti-roll-back feature in forward direction, such that the user can ascend an incline without risk of rolling backwards even when the user releases the lever. The assembly of the lever, transmission and driving wheel are preferably connected in a quick-release fashion that allows easy removal as a unit.

DETAILED DESCRIPTION

Figure 1:
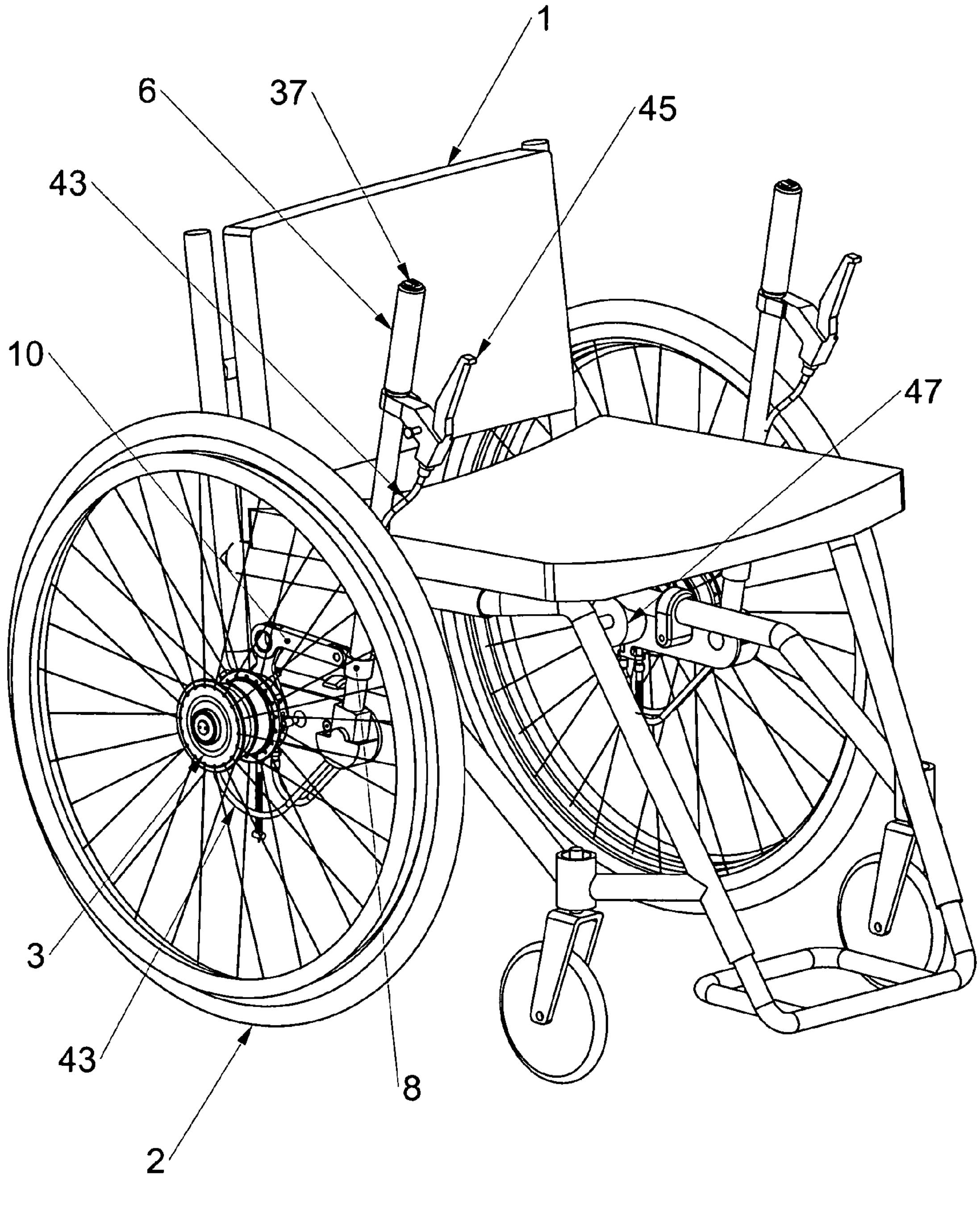
FIG. 1 is a perspective view of a wheelchair that includes drive mechanisms in accordance with the present invention.

The present invention describes a mechanical transmission for use in conjunction with a manually propelled wheelchair. A perspective view of a preferred embodiment is shown in FIG. 1. A manually propelled wheelchair 1 is shown with a left- and right-side drive system. Further description and FIGS. 2-8 relate to the right-side drive system, but also apply to the left-side drive system. As referred to below, left and right relate to the perspective of a person in the wheelchair, while inward/inboard and outward/outboard refer to directions toward and away from the center of the wheelchair, respectively.

Figure 2A:
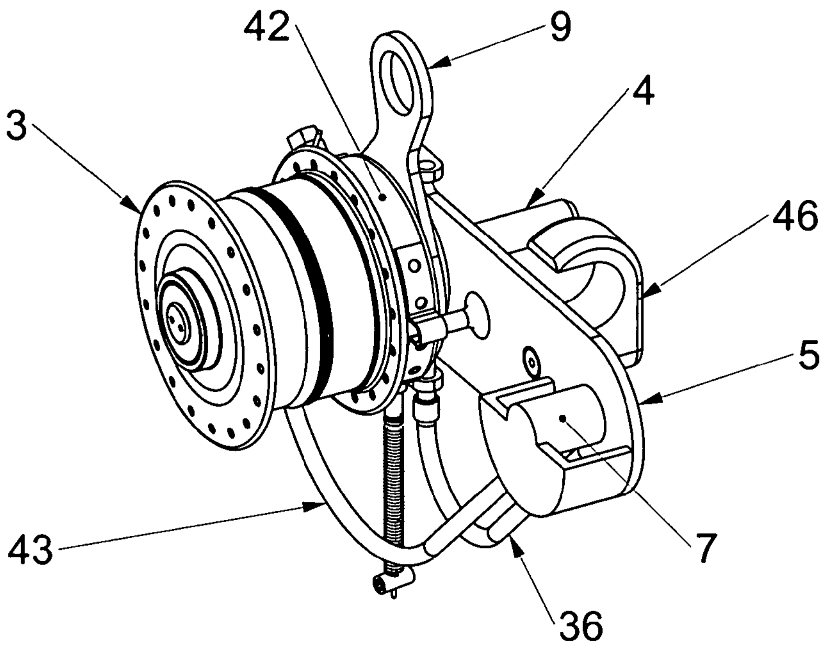
FIG. 2A is a perspective front view of the right-side drive mechanism of FIG. 1.
Figure 2B:
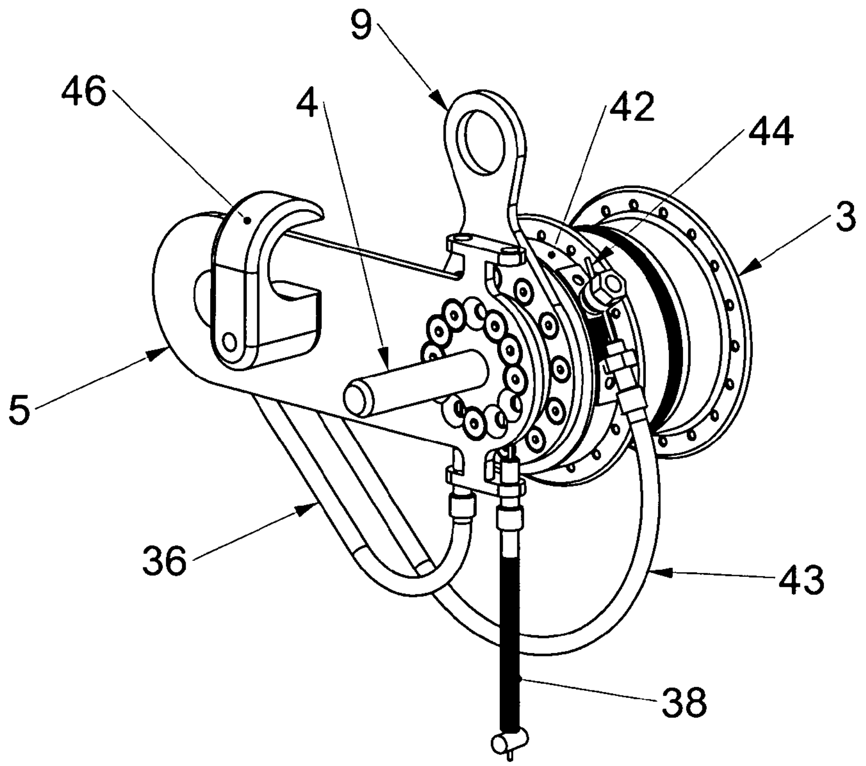
FIG. 2B is a perspective rear view of the drive mechanism of FIG. 2A.

With reference to FIGS. 1, 2A and 2B, each drive system comprises a spoked drive wheel 2 coupled to a hub shell 3 which encloses the transmission. The transmission is supported by an axle 4 about which the drive wheel 2 rotates. The transmission is coupled to a subframe member 5.

A lever 6 having a handgrip end and a pivot end allows a user to propel the wheelchair 1 by a reciprocating rocking motion of a lever 6 about the lever pivot 7. In a preferred embodiment, the lever pivot 7 is supported by the subframe 5. Attached to the lever 6, a collar 8 transmits the reciprocating lever motion to a crank arm 9 as the input of the transmission by means of a pushrod 10. While the proposed embodiment describes the lever 6 pivoting about an axis distinct from the wheel axle 4, another embodiment of the same invention may comprise a lever 6 attached directly to the crank arm 9, and as such, the lever 6 would pivot about the axle 4.

Figure 4:
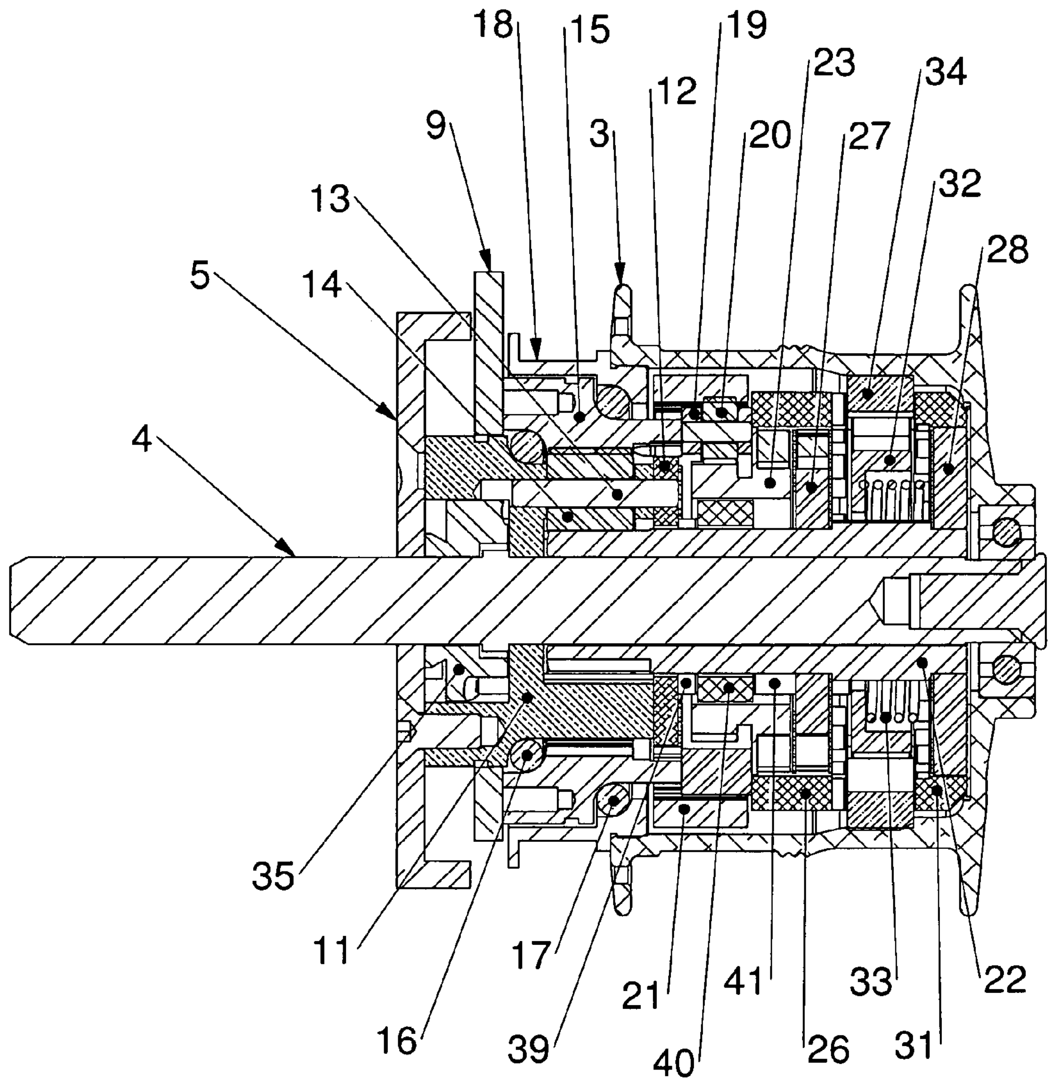
FIG. 4 is a sectional view of the transmission of FIG. 3.
Figure 5:
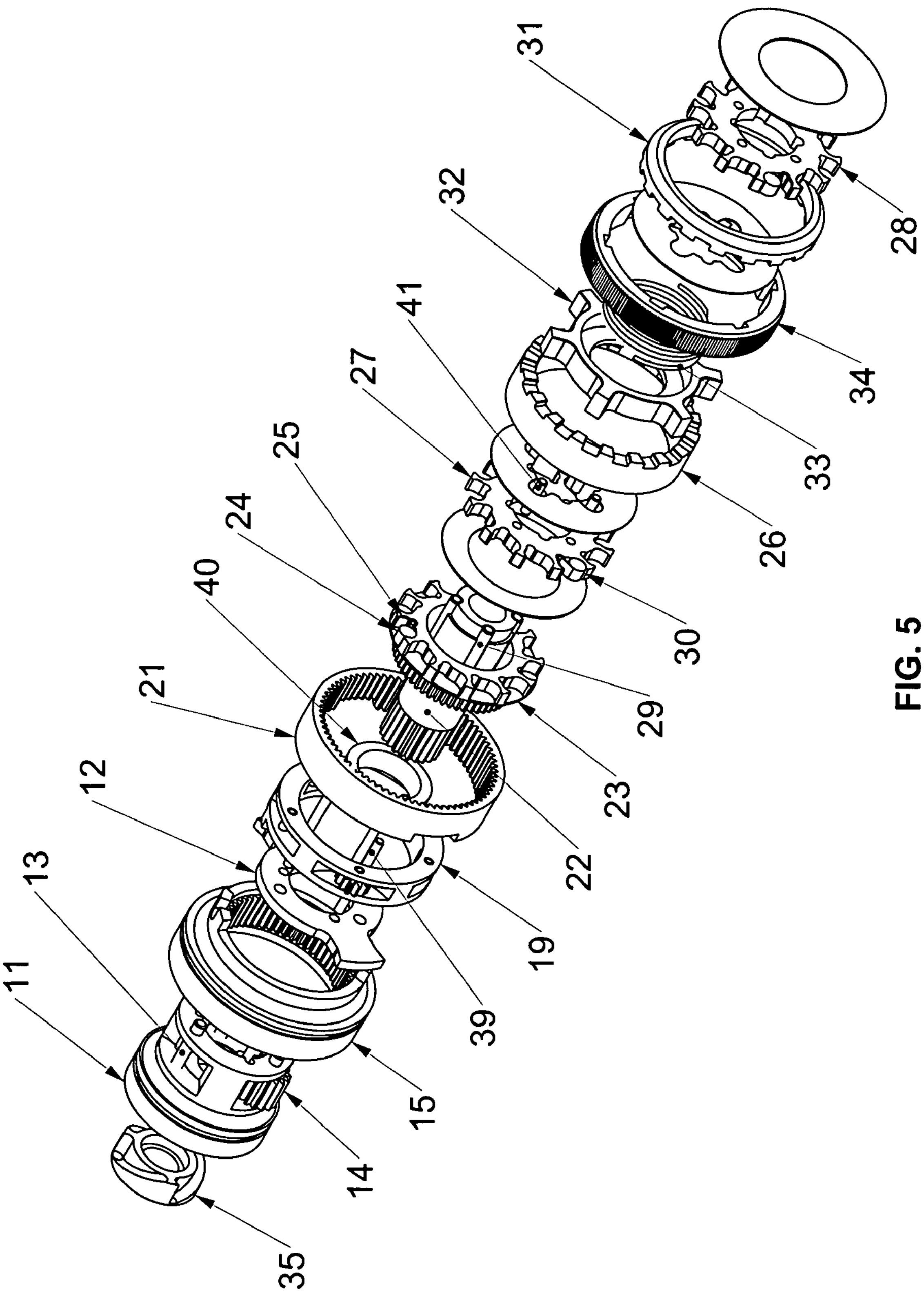
FIG. 5 is an exploded view of the right-side gear train of FIG. 4.
Figure 6C:
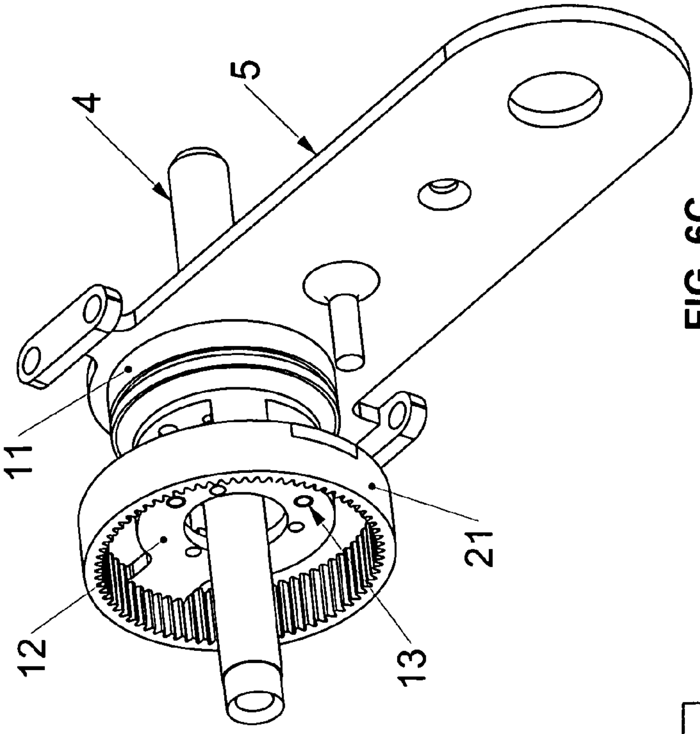
FIG. 6C is a perspective front view of the rotationally fixed components of FIG. 6A.
Figure 6B:
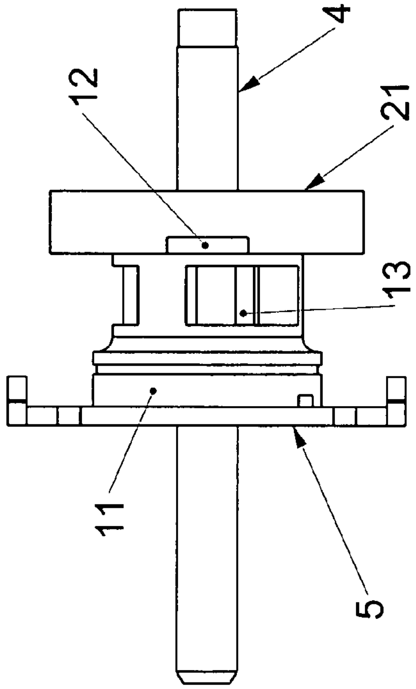
FIG. 6B is a side view of the rotationally fixed components of FIG. 6A.
Figure 6A:
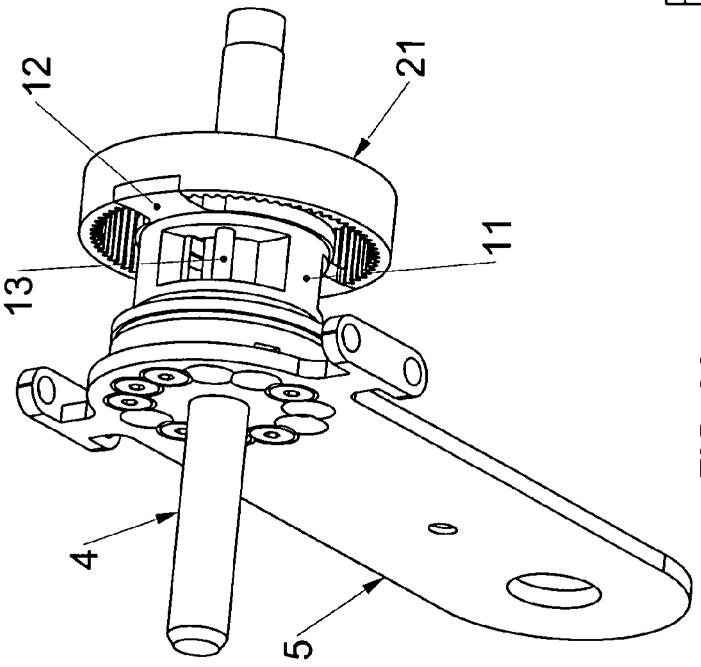
FIG. 6A is a perspective rear view of the rotationally fixed components of the gear train of FIG. 3.
Figure 7C:
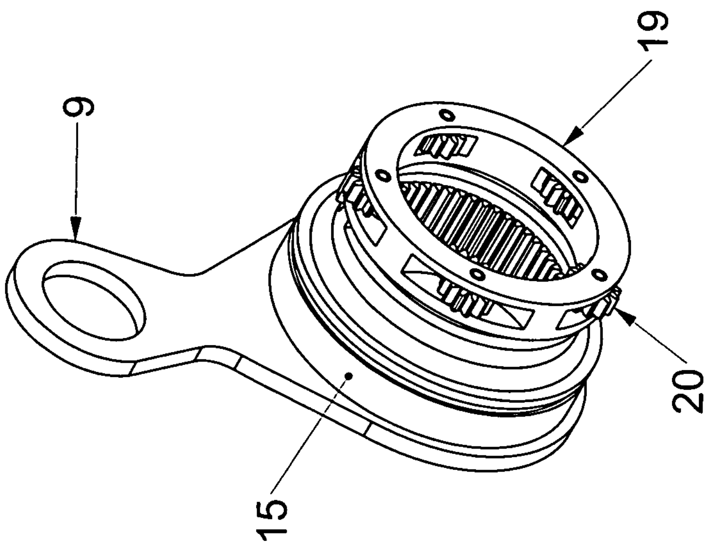
FIG. 7C is a perspective front view of the rotating input components of FIG. 7A.
Figure 7B:
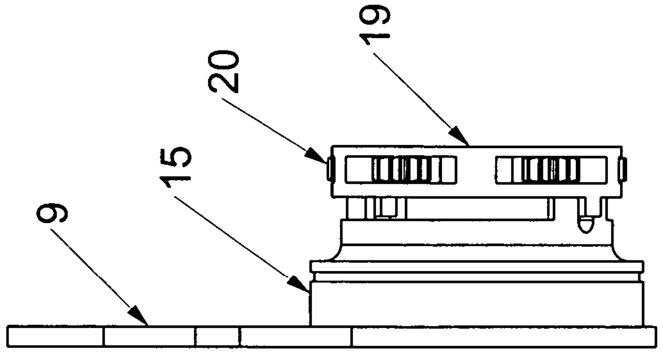
FIG. 7B is a side view of the rotating input components of FIG. 7A.
Figure 7A:
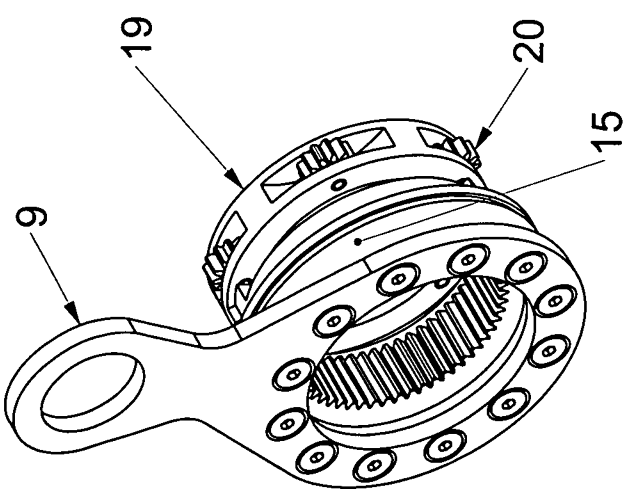
FIG. 7A is a perspective rear view of the rotating input components of the gear train of FIG. 3.

The transmission comprises two interwoven planetary gear systems in which the rotational output from the first system is both amplified and reversed in direction from an input. The rotational output from the second system is amplified and in the same direction as the input. Each planetary gear system has rotationally fixed components which are shown in FIGS. 6A, 6B and 6C. The subframe 5 and axle 4 are both rotationally fixed and mounted to the wheelchair. An inboard planet carrier 11 is fixed to the subframe 5. A fixed web plate 12 is attached to an inboard planet carrier 11 by a number of inboard planet pins 13, which also support a first set of planet gears 14, as shown in FIGS. 4 and 5. The fixed web plate 12 is used to concentrically and rotationally fix an outboard ring gear 21 by a puzzle-piece connection.

The rotating inputs of the transmission are shown in FIGS. 3, 5 and 7A-7C. The crank arm 9 at the input to the transmission is attached to an inboard ring gear 15 that meshes with the planet gears 14 of the inboard planet carrier 11. The inboard ring gear 15 has two integrated angular contact bearing races and is supported by a first set of ball bearings 16 having a mating race on the inboard planet carrier 11. The second angular contact bearing race has an outer ball bearing 17 which supports a braking surface 18 attached to the hub shell 3. An outboard planet carrier 19, having outboard planets 20 that mesh with an outboard ring gear 21, has axial protrusions that connect to mating protrusions on the inboard ring gear 15. As such, a rocking input of the crank arm 9 causes a rocking motion of the inboard ring gear 15 and of the outboard planet carrier 19. Since the input is a reciprocating motion, and rotates less than half way around the transmission, this method used to connect the inboard ring gear 15 to the outboard planet carrier 19 allows the fixed web plate 12 to extend through these rotating planetary gear system inputs and allows the outputs of the planetary systems to be sun gears rotating in opposite directions and substantially equal in speed. Having arranged the gears as such, an inboard sun gear 22 is always driven in the opposite direction of the crank arm 9, while an outboard sun gear 23 is always driven in the same direction as the crank arm 9.

Figure 3:
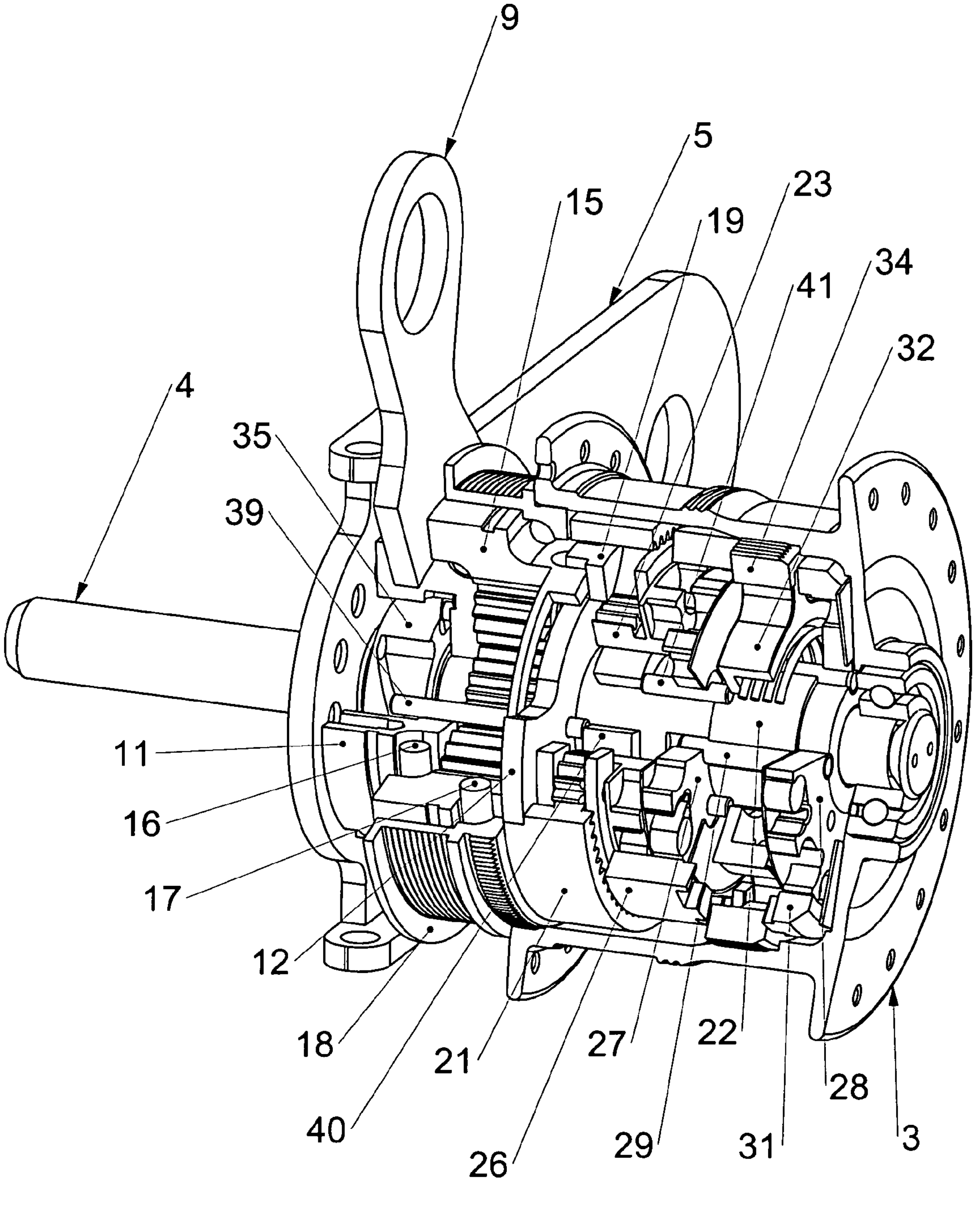
FIG. 3 is a perspective view of one embodiment of a transmission for use in the drive mechanism of FIG. 2A, as exposed by a partially cutaway hub housing.
Figure 8:
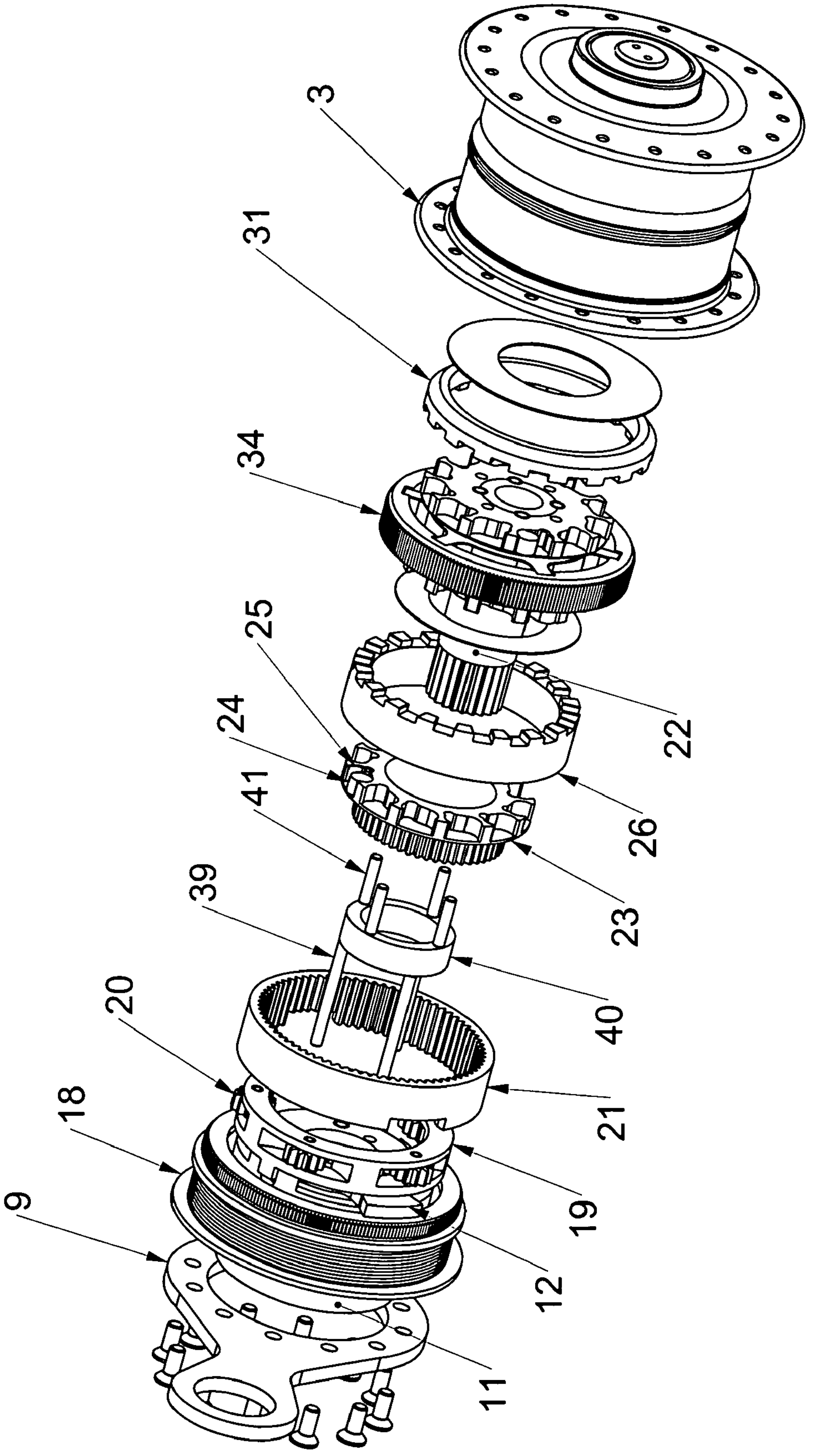
FIG. 8 is an exploded view of a hub housing and hub-contained components in accordance with the invention.

Referring primarily to the exploded views of FIGS. 5 and 8, but also to the assembled views of FIGS. 3 and 4, the larger outboard sun gear 23 has a set of integrated roller ramps such that rollers 24 are pushed by roller springs 25, causing the rollers 24 to wedge between the ramps of the outboard sun gear 23 and an inboard clutch ring 26 when the outboard sun gear 23 is driven in one direction, and resulting in a slippage when driven in the opposite direction. The smaller inboard sun gear 22 passes through the outboard sun gear 23, and has two identical, but oppositely oriented roller carriers 27 and 28 keyed to it by means of key pins 29.

An inboard roller clutch ring 26 has dog clutch teeth pointing axially outward, and spans rollers of the inboard sun 22 and an inboard roller carrier 27, which have ramps oriented in the same direction. Oriented as such, a rocking motion of the crank arm 9 in one direction causes a first set of rollers 24 to grab the inboard clutch ring 26 while the second set of rollers 30 slips, and a rocking motion in the opposite direction causes the first set of rollers 24 to slip, while the second set of rollers 30 grabs the inboard roller clutch ring 26. The result is the rectification of a reciprocating input rotation to a unidirectional output rotation.

An outboard roller clutch ring 31 spans only an outboard roller carrier 28, and has dog clutch teeth pointing axially inward. The outboard roller clutch ring 31 is oriented such that an input rotation in one direction causes the rollers to grab the ring, while an input rotation in the opposite direction causes the rollers to slip.

Constrained between the two roller carriers 27 and 28, a sliding dog clutch member 32 is biased axially inward by a shift spring 33 (FIG. 5). The sliding dog clutch 32 is concentrically and rotationally constrained by a hub spline 34 having internal splines, and which is pressed into and rotates with the hub shell 3. The sliding dog clutch 32 can be pushed axially inward to link the inboard roller clutch ring 26 to the hub spline 34, providing a "forward gear." When the sliding dog clutch 32 is pushed outward, it links the outboard roller clutch ring 31 to the hub spline 34, providing a "reverse gear". In a third, central position of the sliding dog clutch 32, the hub spline 34 is disconnected from both roller clutch rings, providing a "neutral gear". Thus, the sliding dog clutch may be considered as a "third clutch" for engaging and disengaging a "first unidirectional clutch" and a "second unidirectional clutch" to select a forward drive condition, a rearward drive condition, and a neutral condition. The orientation of the roller clutch ramps can be configured to provide different combinations of push/pull/forward/reverse output motion.

In order to shift between forward, neutral, and reverse gears, a shift cam 35 having helical outboard surfaces is rotated on the axle 4 by a shift cable 36 which enters through a slot in the inboard planet carrier 11, wraps around and anchors to the shift cam 35, and exits through another slot in the carrier 11. A shift cable 36 of FIGS. 2A and 2B is pulled when the user actuates a shifter 37 mounted on the hand grip end of the lever 6 of FIG. 1. The shift cam is rotationally biased into the "forward direction" by a shift cam spring 38 anchored to the subframe 5. As shown in FIG. 3, the helical surfaces of the shift cam 35 push a set of inboard shift pins 39 which are free to slide through axial bores in the inboard planet carrier 11 and fixed web plate 12, and in turn, push against a thrust washer 40 concentric to the axle 4. A set of outboard shift pins 41 slide through axial bores in the inboard roller carrier 27, and as such, rotationally move with the inboard sun gear 22 and roller carrier 27. The outboard shift pins 41 are in "slip ring" contact with the thrust washer 40 and the sliding dog clutch 32, which is sprung in the inboard direction by the shift spring 33. The resulting shifting motion comprises an axial actuation of rotationally fixed inboard shift pins 39 pushing the thrust washer 40 which pushes a rotationally reciprocating set of outboard shift pins 41 that axially move the sliding dog clutch 32 that rotates with the hub shell 3. Both the forward and rearward strokes in lever motions rotate the drive wheel 2 in the forward direction with no lost motion.

In the preferred embodiment, there are three modes of operation. In "forward gear," the sliding dog clutch 32 is pushed inboard, such that when a user pushes the lever 6 away from himself/herself (forward stroke), the crank arm 9 rotates, transmitting force to the outboard planet carrier 19 via the inboard ring 15, then to the outboard sun and integrated roller carrier 27, then to the inboard roller clutch ring 26, then to the sliding dog clutch 32, then to the hub spline 34 which is operatively coupled to the drive wheel 2. Still in forward gear, a pull stroke (rearward stroke) of the lever 6 transmits force to the inboard ring gear 15, then to the inboard planets 14 and inboard sun 22, then to the inboard roller clutch ring 26, then to the sliding dog clutch 32, then to the hub spline 34 which is operatively coupled to the drive wheel 2.

In "reverse gear," the sliding dog clutch 32 is pushed outboard, such that when a user pushes the lever 6 in a forward stroke, the crank arm 9 rotates, transmitting force to the inboard ring 15, then to the inboard planets 14 and sun 22, then to the outboard roller carrier 28 then to the outboard roller clutch ring 31, then to the sliding dog clutch 32, then to the hub spline 34 which is operatively coupled to the drive wheel 2. Still in reverse gear, a rearward stroke of the lever results in slip and simply a lost motion stroke.

In "neutral gear," the sliding dog clutch 32 is centered between the two roller clutch rings, and no lever motion is transferred to the hub spline 34. This feature maintains standard pushrim capabilities of traditional wheelchairs.

In each mode described above, all other gear train paths are slipping due to roller clutch slippage or disengaged dog clutches. As an artifact of roller clutches, the drive wheel 2 can freewheel in the desired direction of motion.

In the preferred embodiment, as a result of the inboard roller clutch configuration that was described above, a "hill holder" or "anti-rollback" feature is created in the forward direction, whereby the transmission cannot be backdriven. Such a feature is useful when ascending an incline.

With particular reference to FIGS. 1, 2A, 2B and 8, a band brake 42 is included to selectively stop the rotation of the drive wheel 2. A braking surface 18 with an integrated angular contact bearing race is connected to the hub shell 3. The band brake 42 is anchored substantially at its midpoint to a pin on the subframe 5. A brake cable housing 43 that passes through the lever 6 is anchored to one of the free ends of the band brake 42. The brake cable 44 which passes through the brake cable housing 43 is anchored to the other free end of the band brake 42. When the user actuates a brake lever 45 mounted to the handgrip end of the lever 6, the band brake 42 is cinched and rotational reaction forces are transmitted to the wheelchair frame 1 by means of the subframe 5. As such, the braking forces are not felt in the lever, so that during intense braking, the lever 6 will not be pulled out of the user's hands.

The drive system includes a quick-release mechanism, which in the preferred embodiment comprises a quick release latch 46 that connects the subframe 5 to the frame of the wheelchair 1, such that the entire drive system can be quickly removed from the wheelchair. The quick-release mechanism transmits rotational reaction forces from the subframe 5 to the wheelchair 1, and prohibits the drive system from axially sliding outward from the wheelchair. The other reaction forces caused by use of the drive mechanism are transmitted to the wheelchair 1 by a wheelchair-mounted axle receiver sleeve 47 that is common to most standard manual wheelchairs.

What is claimed is:

1. A drive mechanism for use with a wheelchair comprising:

a lever connected at a pivot to enable lever motion in forward and rearward strokes;

a driving wheel having a circumferential roll surface and having a central hub housing operatively coupled to and substantially radially inward of said roll surface;

a transmission configured to translate said lever motion to rotational drive of said driving wheel, said transmission including at least one gear set coaxial to said driving wheel, said gear set located within said hub housing and coupled such that both of said forward and rearward strokes induce rotation of said hub housing via said gear set, said transmission further including a plurality of clutches coaxial to said driving wheel and located within said hub housing, said clutches being cooperatively coupled within said transmission such that each said forward and rearward stroke in reciprocating motion of said lever is translated to said rotational drive of said driving wheel, said gear set being coupled between said lever and said clutches; and a brake operable at a handgrip end of said lever, said brake being coupled to said driving wheel to selectively restrict rotation of said driving wheel.

2. A drive mechanism for use with a wheelchair comprising:

a lever connected at a pivot to enable lever motion in forward and rearward strokes;

a driving wheel having a circumferential roll surface and having a central hub housing operatively coupled to and substantially radially inward of said roll surface; and a transmission configured to translate said lever motion to rotational drive of said driving wheel, said transmission including at least one gear set coaxial to said driving wheel, said gear set located within said hub housing and coupled such that at least one of said forward and rearward strokes induces rotation of said hub housing via said gear set, said transmission further including at least one clutch coaxial to said driving wheel and located within said hub housing, said gear set being coupled between said lever and said clutch;

wherein said transmission includes first, second and third said clutches contained within said hub housing, said first clutch and said second clutch being operatively associated with said lever and said driving wheel to selectively couple said lever motion into respective forward and rearward drive in response to said lever motion, said third clutch being operatively associated with said first and second clutches to selectively engage and disengage said first and second clutches.

3. The drive mechanism of claim 2 wherein said third clutch has a first condition in which said first clutch is engaged, a second condition in which said second clutch is engaged and a third condition in which both of said first and second clutches are disengaged.

4. The drive mechanism of claim 2 wherein said driving wheel and said transmission are mechanically linked to be mounted to and unmounted from said wheelchair as a unit.

5. The drive mechanism of claim 2 further comprising a brake operable at a handgrip end of said lever, said brake being coupled to said driving wheel to selectively restrict rotation of said driving wheel.

6. A drive mechanism for use with a wheelchair, the drive mechanism comprising:

a lever with a handgrip end and a pivot end, said lever being connected at said pivot end to accommodate reciprocating motion of said lever;

a driving wheel operatively coupled to a central hub housing; and a transmission located internal to said hub housing of said driving wheel and enabled to selectively drive said driving wheel in response to said reciprocating motion of said lever, said transmission including:

a. first and second unidirectional clutches coaxial to said driving wheel, said first unidirectional clutch being connected to translate said reciprocating motion of said lever to a forward drive of said driving wheel, said second unidirectional clutch being connected to translate said reciprocation motion to a rearward drive of said driving wheel, b. a user-controlled clutch coaxial to said driving wheel, said user-controlled clutch being enabled to selectively vary an operative coupling to said driving wheel among a first condition of engagement with said first unidirectional clutch, a second condition of engagement with said second unidirectional clutch, and a third condition of disengagement from both said first and second unidirectional clutches, and c. a gear train coaxial to said driving wheel and including interconnected gears which couple both directions of travel of said reciprocating motion to drive said driving wheel, at least when said user-controlled clutch is in said first condition;

wherein said first unidirectional clutch has a plurality of reciprocating and oppositely rotating inputs oriented to drive an output of said first unidirectional clutch in one desired direction, wherein a first of said inputs is coupled to drive said first unidirectional clutch in the desired direction while a second of said inputs is configured to slip during one input stroke, and wherein said first of said inputs is configured to slip while said second of said inputs drives said first unidirectional clutch in the desired direction during the opposite input stroke, said first unidirectional clutch being configured to prevent back-driving of said transmission.

7. A drive mechanism for use with a wheelchair, the drive mechanism comprising:

a lever with a handgrip end and a pivot end, said lever being connected at said pivot end to accommodate reciprocating motion of said lever;

a driving wheel operatively coupled to a central hub housing; and a transmission located internal to said hub housing of said driving wheel and enabled to selectively drive said driving wheel in response to said reciprocating motion of said lever, said transmission including:

a. first and second unidirectional clutches coaxial to said driving wheel, said first unidirectional clutch being connected to translate said reciprocating motion of said lever to a forward drive of said driving wheel, said second unidirectional clutch being connected to translate said reciprocation motion to a rearward drive of said driving wheel, b. a user-controlled clutch coaxial to said driving wheel, said user-controlled clutch being enabled to selectively vary an operative coupling to said driving wheel among a first condition of engagement with said first unidirectional clutch, a second condition of engagement with said second unidirectional clutch, and a third condition of disengagement from both said first and second unidirectional clutches, and c. a gear train coaxial to said driving wheel and including interconnected gears which couple both directions of travel of said reciprocating motion to drive said driving wheel, at least when said user-controlled clutch is in said first condition, wherein said gear train includes a plurality of interwoven planetary gear sets, each of said planetary gear sets having rotationally restrained members operatively coupled to each other and connected to a subframe configured to transfer reaction forces from said transmission to a frame of said wheelchair.

8. The mechanism of claim 7 wherein said planetary gear sets include rotational members operatively coupled to each other and to a reciprocating rotational input, said rotational members extending through said rotationally restrained members such that outputs of said gear train rotate in opposite directions from one another independent of direction of said reciprocating rotational input.

9. The mechanism of claim 7 wherein said outputs of said gear train are coupled to drive said first and second unidirectional clutches, each said first and second unidirectional clutch having a clutch output with axial protrusions configured to mesh with said user-controlled clutch.

10. The mechanism of claim 9 wherein said user-controlled clutch includes a user-controlled sliding member axially slidably connected and rotationally fixed to said wheel hub, said user-controlled sliding member being configured to operatively link said clutch outputs of said unidirectional clutches to said driving wheel.

11. The mechanism of claim 10 wherein said user-controlled sliding member is spring biased to contact said first unidirectional clutch, thereby biasing the rotation of said driving wheel into one direction of motion.

12. The mechanism of claim 7 further comprising a means to actuate said user-controlled clutch, said means including a first set of rotationally fixed but axially sliding pins extending through said gear train and contacting a thrust ring, said thrust ring transferring axial shifting motion to a second set of sliding pins rotating with inputs of said first and second unidirectional clutches.

13. The mechanism of claim 12 wherein said first set of sliding pins being axially actuated by rotation of a shift cam having helical ramps, said shift cam rotation being controlled by a cable connected to a shifter mounted on said lever.

14. The mechanism of claim 7 wherein said first unidirectional clutch has a plurality of reciprocating and oppositely rotating inputs oriented to drive an output of said first unidirectional clutch in one desired direction, wherein a first of said inputs is coupled to drive said first uni-directional clutch in the desired direction while a second of said inputs is configured to slip during one input stroke, and wherein said first of said inputs is configured to slip while said second of said inputs drives said first unidirectional clutch in the desired direction during the opposite input stroke, said first unidirectional clutch being configured to prevent back-driving of said transmission.

* * * * *